United States Patent [19]

Edamura

[11] Patent Number: 5,057,938

[45] Date of Patent: Oct. 15, 1991

[54] FACSIMILE APPARATUS WITH ERROR CORRECTION AND IMPROVED SWITCHING MEANS

[75] Inventor: Toshiaki Edamura, Atsugi, Japan

[73] Assignee: Ricoh Company, Ltd., Tokyo, Japan

[21] Appl. No.: 478,962

[22] Filed: Feb. 12, 1990

[30] Foreign Application Priority Data

Feb. 16, 1989 [JP] Japan .................................. 1-35017

[51] Int. Cl.$^5$ ........................ H04N 1/32; H04L 1/18; H04L 25/02; H01P 1/10
[52] U.S. Cl. .................................... 358/406; 358/434; 358/435; 358/436; 371/32; 333/101
[58] Field of Search ............... 358/405, 406, 433, 437, 358/439, 463, 434, 435, 436, 438; 333/101, 132; 371/32

[56] References Cited

U.S. PATENT DOCUMENTS

| | | | |
|---|---|---|---|
| 4,149,142 | 4/1979 | Kageyama | 371/32 |
| 4,622,682 | 11/1986 | Kumakura | 371/32 |
| 4,724,407 | 2/1988 | Miura | 333/101 |
| 4,726,027 | 2/1988 | Nakamura | 371/32 |
| 4,750,176 | 6/1988 | Van Veldhuizen | 371/32 |
| 4,939,731 | 7/1990 | Reed | 371/32 |

FOREIGN PATENT DOCUMENTS

| | | | |
|---|---|---|---|
| 53-15015 | 2/1974 | Japan . | |
| 53-23507 | 4/1978 | Japan | 358/463 |
| 57-10577 | 1/1982 | Japan | 358/463 |
| 57-203373 | 12/1982 | Japan | 358/439 |
| 62-51022 | 10/1987 | Japan . | |

*Primary Examiner*—Benjamin R. Fuller
*Assistant Examiner*—Eric Frahm
*Attorney, Agent, or Firm*—Oblon, Spivak, McClelland, Maier & Neustadt

[57] ABSTRACT

A facsimile apparatus includes a transmission system for transmitting with respect to a line, an image signal from a modem, a receiving system for receiving signals from the line, a transmission error detector for detecting the presence of transmission error of received image signals, a backward signal generator for generating backward signals due to the transmission error, notifying the other party of the presence of transmission errors, retransmission circuit for retransmitting image signal when the backward signal is received, the retransmission circuit having a backward signal detector for detecting backward signals, a band pass filter passing signals in a predetermined frequency band, a band elimination filter passing signals in a frequency band other than a predetermined frequency band, an image communication control switcher for switching between an image transmission control and an image receiving control, and retransmission request switcher for switching retransmission control and a response control.

7 Claims, 7 Drawing Sheets

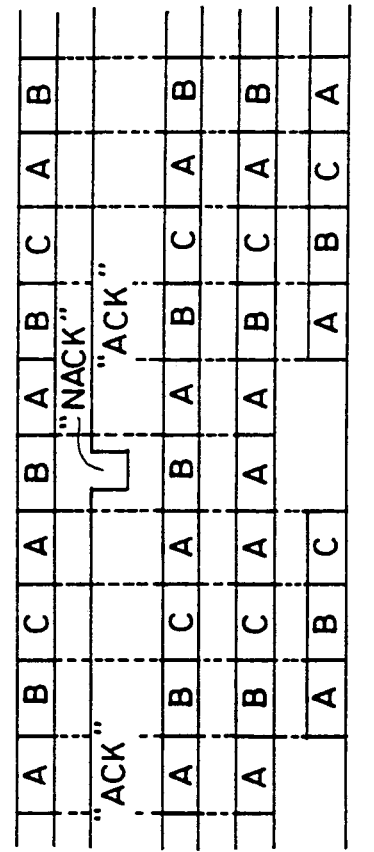

FACSIMILE APPARATUS WITH ERROR CORRECTION AND IMPROVED SWITCHING MEANS

BACKGROUND OF THE INVENTION

1. Field of the Invention

The present invention relates to a facsimile apparatus provided with an image information send/receive function for an automatic request for repetition mode.

2. Discussion of the Background

In general, a facsimile apparatus transmits image information, the facsimile apparatus on the receive side is influenced by stochastic transmission errors that occur due to statuses in a line. An automatic request for repetition mode has been used in order to eliminate the influence of these transmission errors. In the automatic request for repetition mode, when a transmission error has been detected by a facsimile apparatus on the receive side (hereinafter termed a receiver), on the basis of the request from the receiver, a facsimile apparatus on the transmission side (hererinafter termed a transmitter) retransmits the image information.

In such an automatic request for repitition mode, the image information for transmission is divided into blocks of a predetermined data length and each block data is, for example, shaped into frames with the format indicated in FIG. 1. Then, the transmitter transmits the data in the block order indicated in FIG. 2. The frame indicated in FIG. 1 is the unit of information transfer for HDLC (High Level Data Link control procedure). This frame has a start flag (SF) comprising a predetermined bit pattern expressing the head of the frame, an address field (AF) comprising a predetermined bit pattern, a control field (CF) expressing the block order of the transmission data, a data field (DT) in which the image information for transmission is arranged in units of one block, a frame check sequence (FCS) for detecting data errors generated in the frame, and an end flag (EF) comprising a predetermined bit pattern expressing the end of the frame. In addition, in the automatic request for repetition mode, "A", "B" and "C" are used as the block order information arranged in the control field (CF).

The receiver refers to the frame check sequence (FCS) of the received frame and makes a judgment as to whether or not there are any data errors in the received frame. If it judges that a data error does not occur, the receiver sends the signal (ACK) which has a predetermined frequency expressing the normal receiving as the response. If it judges that there is a data error, then the receiver drops the level of the signal (ACK) while the next frame data is being received. This is to say that the signal (NACK) is sent as a response. (Refer to FIG. 2(b).) Then, when the signal (ACK) is received by the transmitter, the transmitter successively transmits the frame in which the data of the following frame has been set, and when the signal (NACK) is received, retransmits the block from the frame two before that frame which was received. When the receiver receives the frame for the block for which receive was expected, if that frame includes no errors, then the contents of the data field (DT) of that frame are taken as image information (Refer to FIG. 2(c) through (e).)

In this manner, when a data transmission error has occurred, the receiver notifies the transmitter to retransmit the block in which the transmission error has occurred. The transmitter then retransmits the data for the block for which the request was made. Accordingly, the receiver can obtain image information that does not contain any errors.

Now, as the signal (ACK) and the signal (NACK) which are sent from the receiver to the transmitter, a so-called backward band signal, are transmitted at such as 330 HZ for example, separated from the frequency band used by the modem functions in order to transmit the information is used.

FIG. 3 indicates the configuration of a transmission control portion of a conventional facsimile apparatus having an automatic request for repetition mode using such a backward signal. The signal from a telephone line is input to a network control device (not indicated in the figure) that connects a facsimile apparatus and a telephone line. The signal output from the network control device is received by the facsimile apparatus. The receive signal in this facsimile apparatus is supplied via a high-pass filter 1 to remove the signal component of the low-frequency band and which is included in the telephone line, to a band elimination filter 2 and a band-pass filter 3. The band elimination filter 2 removes the signal component of the frequency $f_1$ of the backward signal from the input signals. The signal output from this band elimination filter 2 is supplied via an equalizing circuit 4 to the receive signal input terminal of a modem (not indicated in the figure). The band-pass filter 3 extracts only the signal components of the frequency of the backward signal. The signals output from this band-pass filter 3 are supplied to a backward signal detect circuit 5. The signal (SB) output from this backward signal detect circuit 5 is supplied to a controller 6 that performs the function control processing for this transmission portion. The transmission signal output from the modem is supplied to an input terminal 8a of a 3-terminal switcher 8. This transmission signal is also supplied to a band elimination filter 9 via an amplifier 7. The band elimination filter 9 removes the signal component of the frequency $f_1$ from the input signal and the signals output from this band elimination filter 9 are supplied to an input terminal 8b of the 3-terminal switcher 8. The backward signal generation circuit 10 generates backward signals in order to respond to the transmitter in the automatic request for repetition mode. The signals from this backward signal generation circuit 10 are supplied to a band pass filter 11. The band pass filter 11 extracts the signal component of the frequency $f_1$ from the input signals and the signal output from this band pass filter 11 is supplied to an input terminal 8c of a 3-terminal switcher 8. The signals output from a common connection terminal 8d of the 3-terminal switcher 8 is input to the band pass filter 13 via an attenuator 12. The band pass filter 13 extracts from the input signals, the signal of the frequency band in accordance with the frequency characteristics of the telephone line. The signal output from this band pass filter 13 is supplied to the input terminal of the network control apparatus connected to the telephone line. In addition, the amplifier 14 and a second call signal detect circuit 15 detect second call signals, such as tone signals of 1300 Hz for example, supplied via the telephone line and the network control apparatus to call the facsimile apparatus. The detect signal from the second call signal detect circuit 15 are supplied to a controller 6.

When transmission and receive of a transmission control procedure signal is performed in accordance with the transmission control procedures and using a low-speed modem function (CCITT V.21 modem function) of a modem, and when image information is transmitted without using an automatic request for repetition mode, the instructions from the controller 6 are used as the basis for the 3-terminal switcher 8 to switch the input terminal 8a. By the 3-terminal switcher 8 selecting the input terminal 8a, the signal output from the modem is supplied to the attenuator 12 via the 3-terminal switcher 8 and the signal is adjusted to an appropriate level by the attenuator 12. The signal output from the attenuator 12 is output to the network control apparatus via a band pass filter 13 and is also output to a telephone line via the network control apparatus. In this case, the signals received via the telephone line are sent to a modem via the high-pass filter 1, the band elimination filter 2 and the equallizing circuit 4.

In the automatic request for repetition mode, when the image information is sent, the instructions from the controller 6 are used as the basis for the 3-terminal switcher 8 to switch the input terminal 8b. Accordingly, the modulated signal for the image information output from the modem is input to the band elimination filter 9 via the amplifier 7. The backward signal component in the modulated signal is removed by the band elimination filter 9. Then the output signal from the band elimination filter 9 is supplied to the network control apparatus via the 3-terminal switcher 8, the attenuator 12 and the band pass filter 13.

The controller 6 judges whether the backward signal sent from the receiver is the signal (ACK) or the signal (NACK) while monitoring the detection signal from the backward signal detect circuit 5. The results of this judgment are used as the basis for performing retransmission processing of the block data described above.

In addition, in the automatic request for repetition mode, when the image information is received, the 3-terminal switcher selects the input terminal on basis of the instruction from the controller 6. Then the backward signal generation circuit 10 generates a backward signal in accordance with the error judgment result for the frame of the received image information in order to notify of the error generation status for the received frame. This backward signal has the frequency components of other frequencies removed by the band pass filter 11. Then, the signal output from the band pass filter 11 is output to the network control apparatus via the switcher 8, the attenuator 12 and the band pass filter 13 and is then output to the telephone line via the network control apparatus.

When the backward signal is output to the transmission line of the telephone line, the backward signal appears in line due to the crosstalk. However, the component of the backward signal included in the receive signal input to the high-pass filter 1 is removed by the band elimination filter 2 and so deterioration of the receive signal by this component is prevented.

In the facsimile apparatus having a configuration such as this, the band elimination filter to remove the backward signal and the band pass filter to extract the backward signal are both provided with a transmission system and a receive system for the signals.

The band elimination filter and the band pass filter that are provided to each system are not simultaneously used. Accordingly, when both the band elimination filter and the band pass filter have been provide with these, it is both superfluous and increases the cost of the apparatus.

SUMMARY OF THE INVENTION

Accordingly, a general object of the present invention is to provide a novel and useful facsimile machine in which the disadvantages of the aforementioned prior art are eliminated.

A more specific object of the present invention is to provide a facsimile apparatus having no superfluous parts in the configuration.

The above objects of the present invention can be achieved by a facsimile apparatus which comprising a transmission system for transmitting, with respect to a line, an image signal from a modem which has been divided into predetermined block units, a receiving system for receiving signals from the line, transmission error detect means for detecting the presence of transmission errors of image signal blocks that have been received by the receiving system, backward signal generation means for generating backward signals for, on the basis of detection results of the transmission error detect means, notifying the other party of the presence of transmission errors, and retransmission means for retransmitting image signal blocks by the transmission system when the backward signal is received by the receiving system, the retransmission means having a backward signal detection means for detecting backward signals in received signal. Further features include a band pass filter for passing signals in a predetermined frequency band including a frequency of the backward signal, a band elimination filter passing signals in a frequency band other than the predetermined frequency band including the backward signal, image communication control switching means for switching between an image transmission control to transmit image signals from a modem, via the band elimination filter and from the transmission system to the line, and an image receiving control to transfer image signals received by the receiving system to the modem via the band elimination filter, and retransmission request switching means for switching between a retransmission control to supply image signals received by the receiving system to the backward signal detection means via the band pass filter, and a response control to send the backward signal from the backward signal generation means to the line via the band pass filter.

Other objects and further features of the present invention will be apparent from the following detailed description when read in conjunction with the accompanying drawings.

BRIEF DESCRIPTION OF THE DRAWINGS

FIG. 1 is a outline view indicating the frame format for the sending of image information in an automatic request for repetition mode;

FIG. 2 is a timing chart for describing the automatic request for repetition mode;

DESCRIPTION OF THE PREFERRED EMBODIMENT

Figure 4:
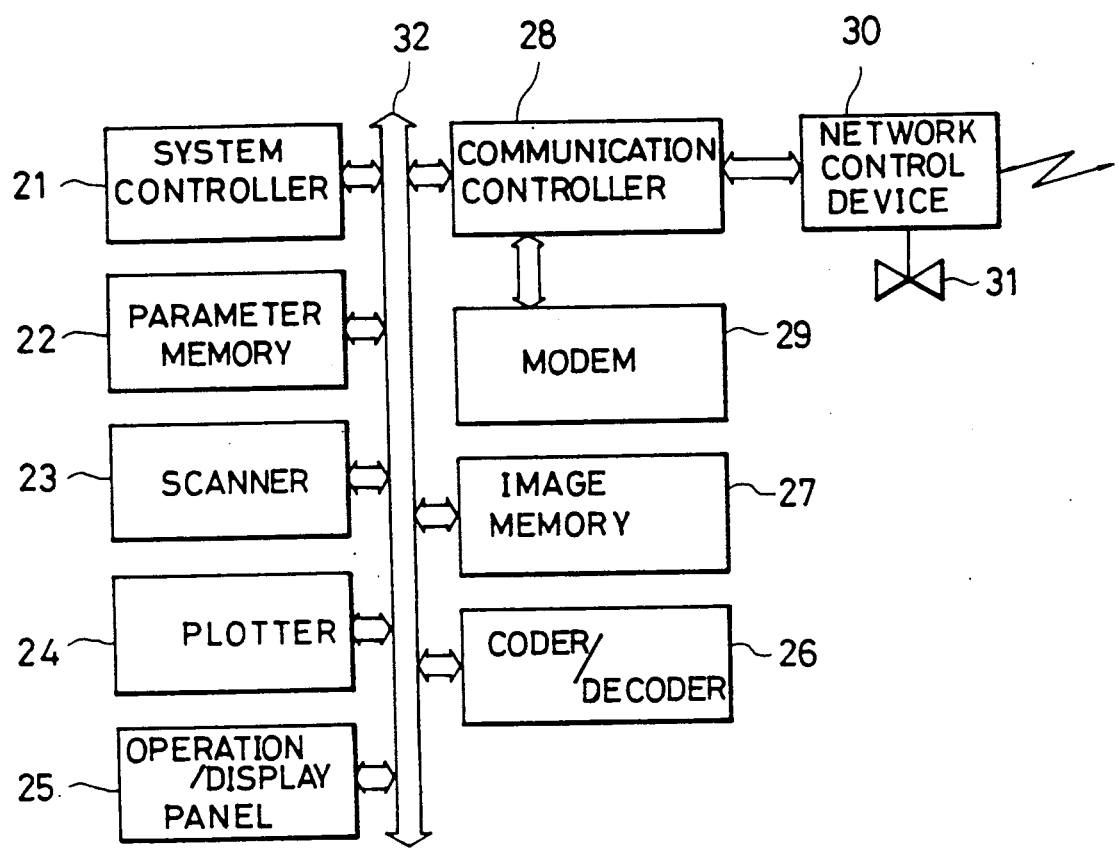
FIG. 4 is a block diagram indicating a facsimile apparatus of an embodiment according to the present invention.

FIG. 4 indicates the overall configuration of a facsimile apparatus of an embodiment according to the present invention.

A system controller 21 performs control processing of each of the communications functions of this facsimile apparatus. A parameter memory 22 stores each of the types of information characteristic to this facsimile apparatus. A scanner 23 scans an original and reads an image on that original to predetermined resolution. A plotter 24 outputs an image at a predetermined resolution. An operation/display panel 25 is the interface between the facsimile apparatus and the operator and has various types of operation keys, and a display for the display of the various types of information to the operator. A coder/decoder 26 codes and compresses the image signals and decodes the coded and compressed image signals back to the original image signals. An image memory 27 stores a plural number of coded and compressed image information. A communications controller 28 performs predetermined facsimile transmission control procedure processing. This communications controller 28 is provided with an image information transmission function for the automatic request for repetition mode. A modem 29 performs modulation and demodulation processing in order to send and receive the digital data via a telephone line. This modem 29 is provided with a plural number of high-speed digital functions in addition to low-speed modem functions. The CCITT V.21 300 bps modem functions are the functions that are used as the low-speed modem functions. The low-speed modem functions are used for transmitting and receiving transmission control procedure signals. The CCITT V.27 ter 2400 bps and 4800 bps modem functions and the V.29 9600, 7200 bps modem functions are the functions that are used as the high-speed modem functions. The high-speed modem functions are used for transmitting and receiving image information signals A network control apparatus 30 is provided with automatic transmission and receive functions, and connects the facsimile apparatus to the telephone line. In addition, this network control apparatus 30 is provided with a telephone set 31. This telephone set 31 can be used by the operator to make a call.

The system controller 21, parameter memory 22, scanner 23, plotter 24, operation/display panel 25, coder/decoder 26, image memory 27, and communications controller 28 are connected to a system bus 32. The sending and receiving of the various types of information between these elements is performed via this system bus 32.

Figure 3:
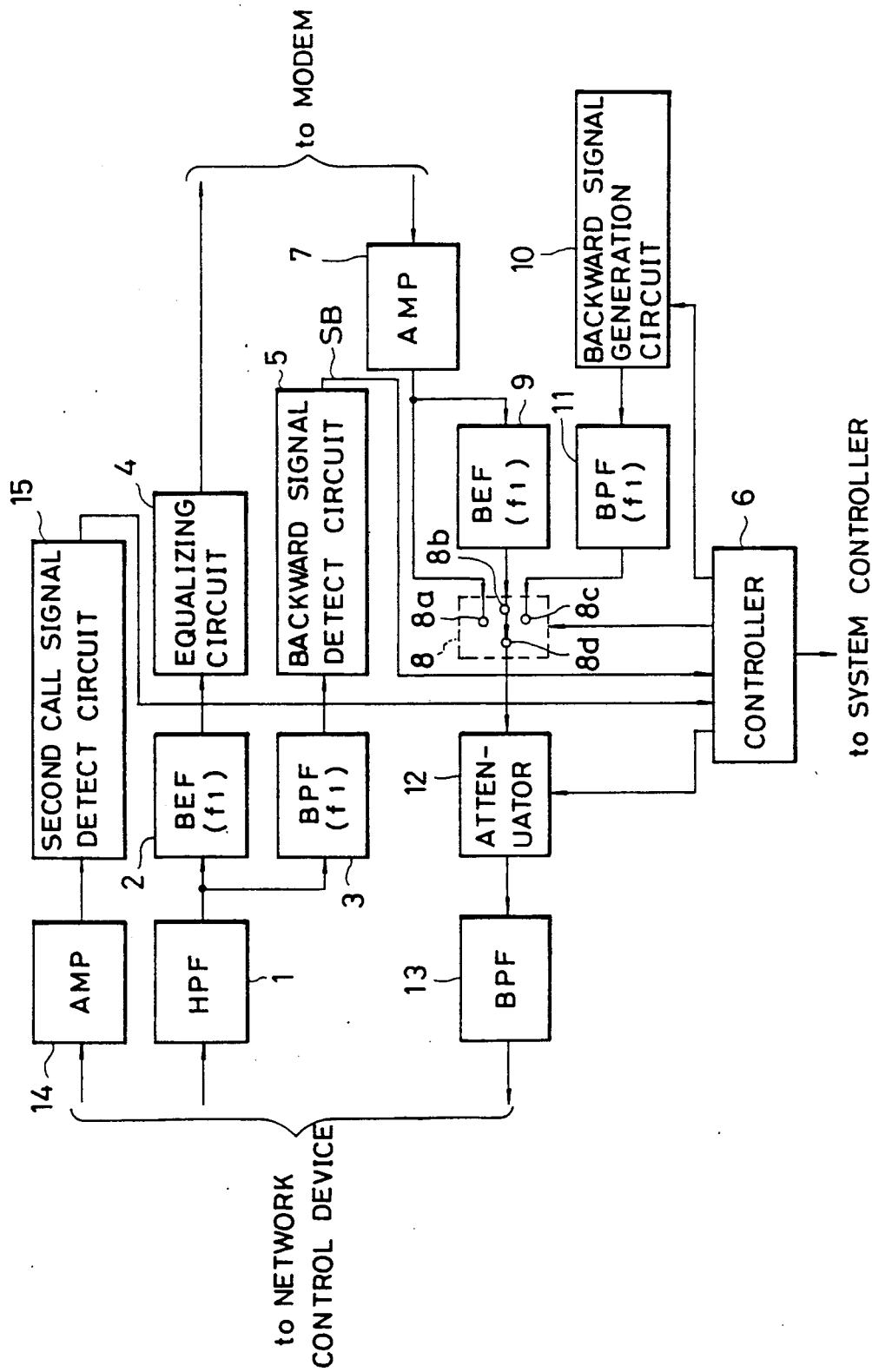
FIG. 3 is a block diagram indicating a conventional configuration for a communications controller.
Figure 5:
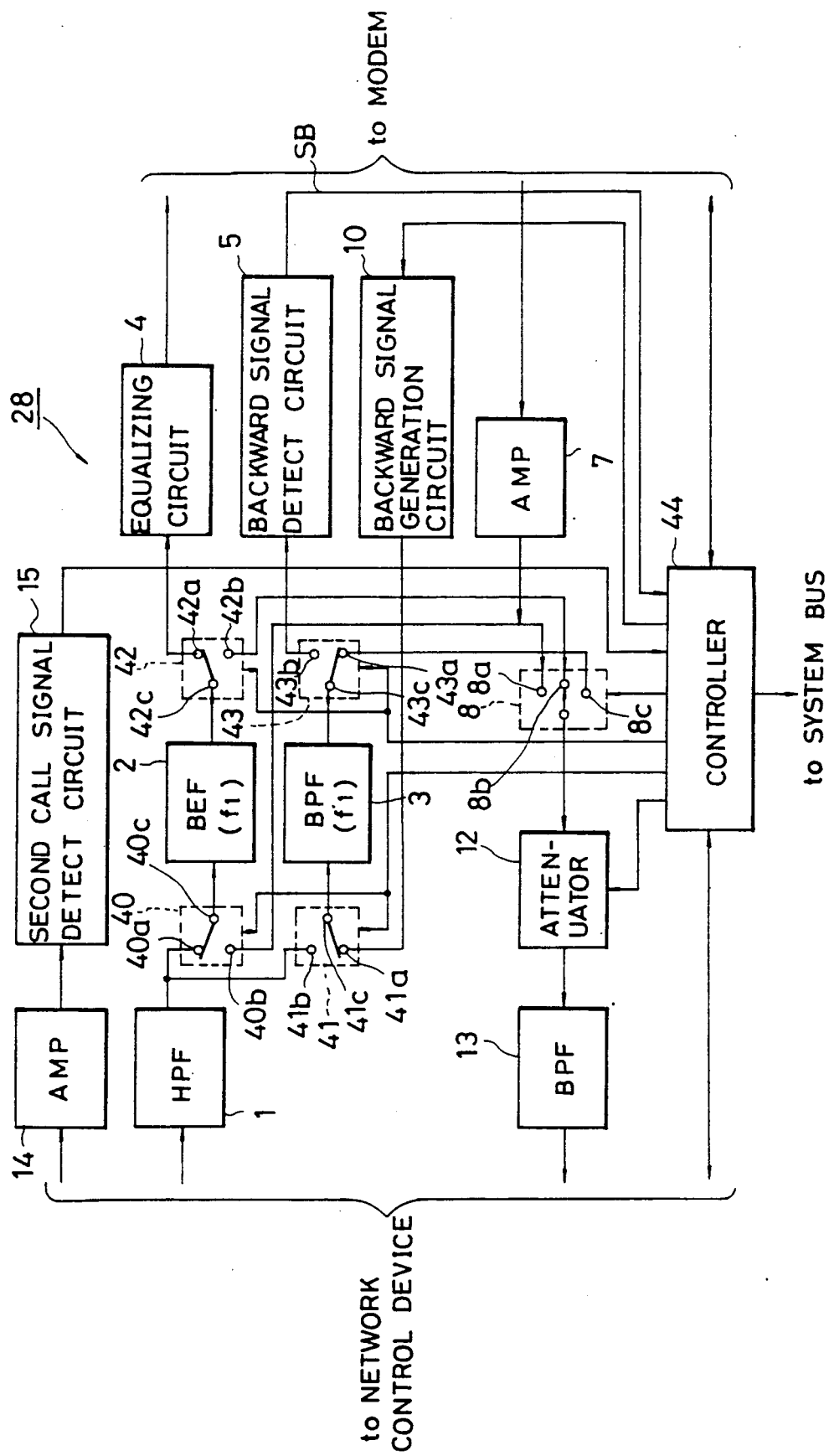
FIG. 5 is a block diagram indicating an example of a configuration of a communications controller.

The communications controller 28 has a configuration as is shown in FIG. 5, for example. In FIG. 5, those parts which are the same as those indicated in FIG. 3, are indicated with the same numerals.

The signal output from a high-pass filter is respectively supplied to a switching terminal 40a of a switcher 40, and a switching terminal 41b of a switcher 41. The switching terminal 40b of the switcher 40 has the signal output from the modem supplied via the amplifier 7, and the other switching terminal 41a of the switcher 41 has the backward signals generated by the backward signal generation circuit 10 supplied to it. A common connection terminal 40c of a switcher 40 is connected to an input terminal of the band elimination filter 2. The common connection terminal 41c of the switcher 41 is connected to an input terminal of the band-pass filter 3. The signal output from the band elimination filter 2 is supplied to a common connection terminal 42c of a switcher 42, and the signal output from the band-pass filter 3 is supplied to a common connection terminal 43c of a switcher 43. The connection terminal 42a of the switcher 42 is connected to the input terminal of the equalizing circuit 4 and the other terminal 42b is connected to an input terminal 8b of the 3-terminal switcher 8. The connection terminal 43a of the switcher 43 is connected to the input terminal 8c of the 3-terminal switcher 8 and the other terminal 43b is connected to an input terminal of the backward signal detect circuit 5. The operation of these switchers 40 through 43 is controlled by a controller 44.

When the transmission control procedure signals are transmitted and received in accordance with transmission control procedures, and when the transmission and receive of image information in the normal transmission mode when an is not automatic request for repetition mode is not performed, the 3-terminal switcher 8 selects the input terminal 8a, the switcher 40 selects the switching terminal 40a, and the switcher 42 selects the connection terminal 42a, on the basis of the instruction from the controller 44. In the following description, this situation for the wiring is referred to as the normal mode.

In this normal mode, the transmission signal output from the modem 29 is output to the network control apparatus 30 via the amplifier 7, the 3-terminal switcher 8, the attenuator 12, and the band pass filter 13. In addition, the receive signal from the telephone line input from the network control apparatus 30 is output to the modem 29 via the high-pass filter 1, the switcher 40, the band elimination filter 2, the switcher 42 and the equalizing circuit 4.

In the automatic request for repetition mode, when image information is transmitted, the 3-terminal switcher 8, selects the input terminal 8b the switcher 40 selects the switching terminal 40b, the switcher 40 selects the connection terminal 41b, the switcher 42 selects the switching terminal 42b and the switcher 43 selects the switching terminal 43b, on the basis of the instruction from the controller 44. In the following description, this situation for the wiring is referred to as the full-duplex transmission mode.

In this full-duplex transmission mode, the transmission signal output from the modem 29 is output to a network control apparatus 30 via the amplifier 7, the band elimination filter 2, the switcher 42, the 3-terminal switcher 8, the attenuator 12 and the band pass filter 13. In addition, the receive signal from this network control apparatus 30 is output to a backward signal detect circuit 5 via a high-pass filter 1, a switcher 41, a band-pass filter 3 and a switcher 43.

In the manner as has been described above, the transmission signal from the modem 29 passes through the band elimination filter 2 when in the full-duplex transmission mode so that this transmission signal is transmitted to the line in the status where the signal component of the frequency $f_1$ of the backward signal has been removed. In addition, the receive signal from the line and via the network control apparatus 30 passes through the band pass filter 3 so that the signal component of the frequency $f_1$ of the backward signal is extracted. Then, because the extracted signal component of the frequency $f_1$ is input to the backward signal detect circuit 5, the backward signal detect circuit 5 can detect the response situation of the backward signal from the receiver (as to whether it is the signal (ACK) or the signal (NACK)).

In the automatic request mode, when image information is received, the 3-terminal switcher 8 selects the input terminal 8c, the switcher 40 selects the switching terminal 40a, the switcher 41 selects the connection terminal 41a, the switcher 42 selects the connection terminal 42a and the switcher 43 selects the connection terminal 43a, on the basis of the instruction from the controller 44. In the following, this wiring mode is called the full-duplex receive mode.

In this full-duplex receive mode, the backward signal output from the backward signal generation circuit 10 is output to network control apparatus 30 via the switcher 41, the band-pass filter 3, the switcher 43, the 3-terminal switcher 8, the attenuator 12 and the band pass filter 13 on the basis of the instruction of the controller 44. In addition, the receive signal from the network control apparatus 30 is output to the modem 29 via the high-pass filter 1, the switcher 40, the band elimination filter 2, the switcher 31 and the equivalence circuit 4. Accordingly, when in this full-duplex receive mode, the frequency bands of the backward signal generated in accordance with the results of receive for that frame is limited. Then, the backward signal for which the frequency band has been limited is output to the telephone line via the network control apparatus 30. In addition, in order for the receive signal to pass the band elimination filter 2, the component of the backward signal that has entered the receive line from the send line is removed from that receive signal. Then, the signal from which that backward signal has been removed, is output to the modem 29.

The following is a description of how image information transmission is performed between two such facsimile apparatus.

When in the stand by status, each of the communications controllers 28 of the transmitter and the receiver are set to the normal mode. The operator on the side of transmitter sets an original in the scanner 23. Then, the operator operates the operation/display panel 25 to set the automatic request for repetition mode, to input the number of the destination, and to perform the transmission start operation. When the operator performs the transmission start operation, the transmitter starts scanning the original that has been set in the scanner 23. The image signals corresponding to the originals that have been successively output from the scanner 23 are coded and compressed by the coder/decoder 26. The image information obtained from this coding and compression of the signals is stored in an image memory 27. Then, the transmitter apparatus calls out to the other party that has been specified by the input number.

Figure 6:
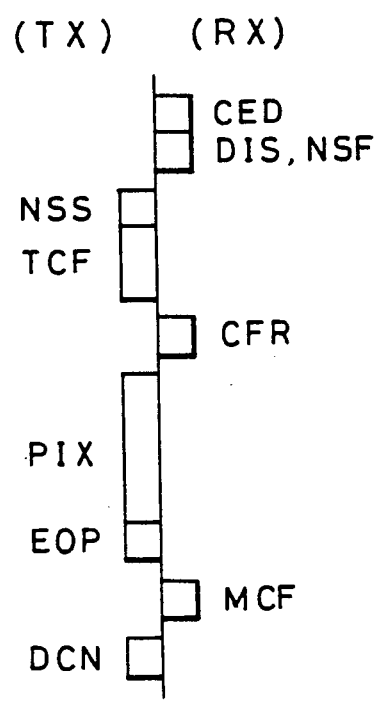
FIG. 6 is a timing chart indicating one example of facsimile realtime communications.

The receiver is called (incoming call detect) by this call out from transmitter and then communications between the transmitter and the receiver apparatus are performed in accordance with the timing chart indicated in FIG. 6.

The receiver apparatus returns the called station identification signal (CED) that expresses that station is a non-voice terminal and then sends the digital identification signal (DIS) to notify of the transmission functions that are provided as standard for that station, and the non-standard function identification signal (NSF) to notify of the non-standard transmission functions that are provided. These non-standard transmission functions include the automatic request for repetition mode.

The transmitter uses this non-standard function identification signal (NSF) from the receiver as the basis for judging whether or not the receiver has the automatic re-send request for repetition mode, and if it has, sends the non-standard function set signal (NSS) that expresses the transmission functions necessary for the transmission of image information for that time. These transmission functions include the automatic request for repetition mode. After this, the transmitter switches the high-speed modem functions of the transmission speed set for the modem 29 of that machine (that machine itself). Then, the transmitter transmits the training signal (TCF) at the set transmission speed, to train the modem 29 of the destination party.

When the receiver receives the non-standard function set signal (NSS), it analyzes its contents and stores the results of that analysis. The modem 29 is then switched to the low-speed modem functions or the high-speed modem functions that are set at that time. Then, the receiver receives the training signal (TCF) and then if the receive results are favorable, the receiver returns the receive standard confirmation signal (CFR). When the return of this receive standard confirmation signal (CFR) is completed, the communications controller 28 is switched to the full-duplex receive mode.

When the transmitter receives the receive standard confirmation signal (CFR), the communications controller 28 is switched to the full-duplex transmission mode. Then, the transmitter forms the transmission image information (PIX) that has been stored in the image memory 27 at that time, into frames as has been described above, modulates them using the modem 29 and transmits them. The receiver analyzes the received frames and checks for whether there are any errors. If no error in the received signals has been detected as has been described above, then, the backward signal generation circuit 10 outputs the backward signal (signal (ACK) status). In addition, when a receive signal error is detected, then the transmission of the backward signal from the backward signal generation circuit 10 is stopped (signal (NACK) status). When the signal (SB) output from the backward signal detect circuit 5 is risen up, then it is judged that the signal (ACK) has been received. In addition, it is judged that the signal (NACK) has fallen when the signal (SB) falls. Then, when it is judged that the signal (NACK) has been received, the transmitter retransmits the frame. In the receiver, the received frames which are recognized into the order in which they were expected and the frames for which there are not errors, are successively stored in the image memory 27. In addition, the receive signals are demodulated into the original image signals by the coder/decoder 26 and these demodulated signals are used as the basis for the detection of errors in the image information. Then, when the transmitter completes the transmission of the image information (PIX), the communications controller 28 is switched to the normal mode and the procedure end signal (EOP) is transmitted. When the receiver detects the end of one page of the transmission image information (PIX), then the communications controller 28 is set to the normal mode and the receiver waits for the message tail signal. At this time, the procedure end signal (EOP) is transmitted from the transmitter and so the receiver returns the message confirmation signal (MCF) when the results of demodulation for the received image information are normal. When the transmitter receives this message confirmation signal (MCF), it transmits the disconnect instruction signal (DCN) and restores the line. This is the end of the image information transmission operation. In addition, the line is also restored and the image information receive operation ends when the receiver receives the disconnect instruction signal (DCN). Furthermore, the receiver demodulates the received image information stored in the image memory 27 at an appropriate timing and the image signal obtained by the demodulation is transferred to the plotter 24. Then, the plotter 24 uses the transferred image signals as the basis for recording the image onto a recording sheet.

As has been described above, the image information transfer is performed in the automatic request for repetition mode. Mode switching is not performed for the communications controller 28 when there is image information transfer in the normal mode.

Figure 7:
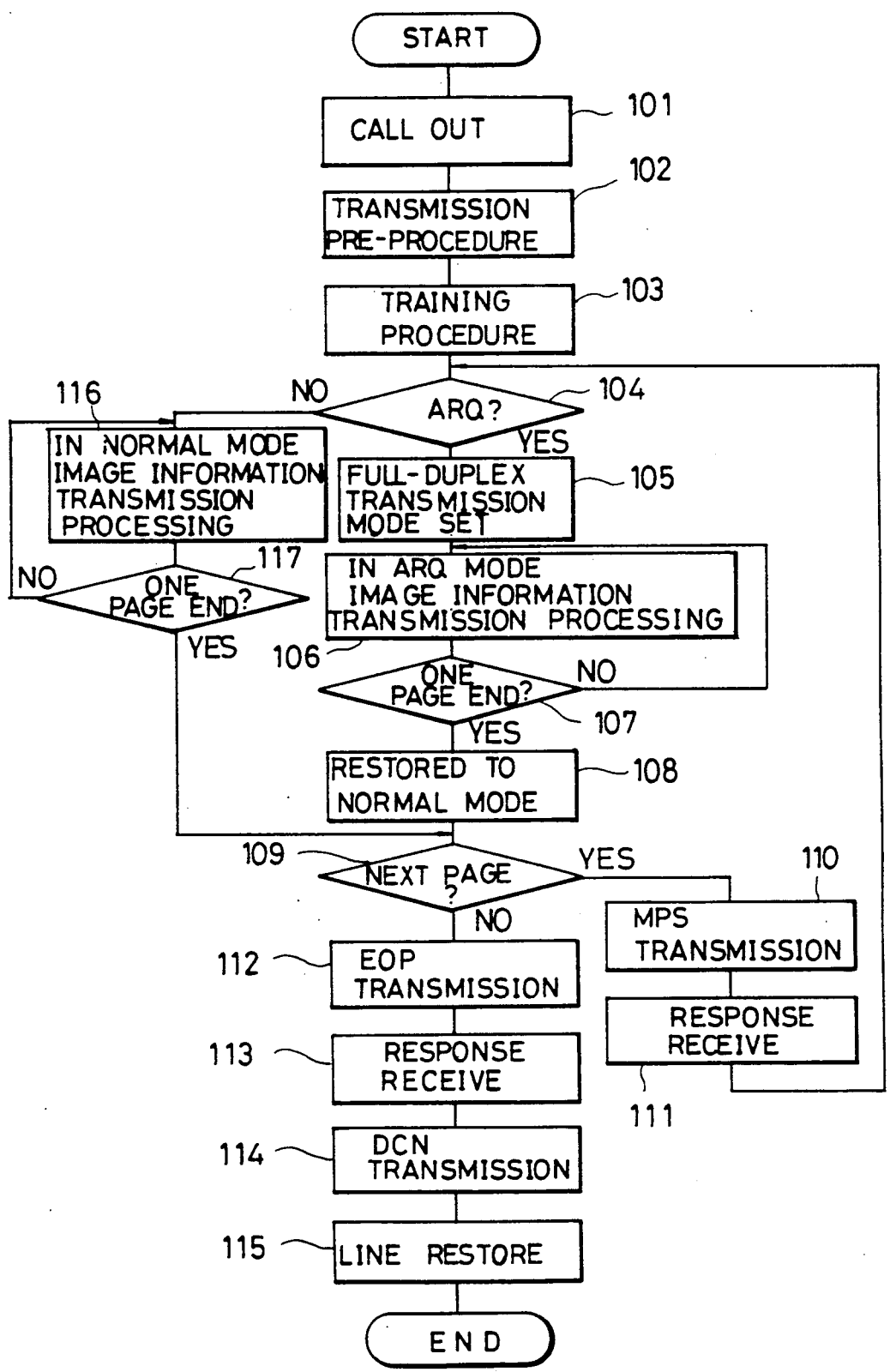
FIG. 7 is a flow chart indicating an example of the processing for transmission.

FIG. 7 shows an example of the processing for transmission operation in the transmitter. This processing is performed on the basis of the instructions from the controller 44. First of all, the network control apparatus 30 is connected to the line due to the transmission start instruction on basis of the operation by the operator. Then, the transmitter calls out the party specified by the telephone number input by the operator (Step 101), performs the transmission pre-procedures (Step 102), and sets the transmission functions between the transmitter and the receiver. In addition, at this time, the transmitter performs the training procedures (Step 103) in order to train the modem 29 to set the modem speed.

Furthermore, a check is made for whether the automatic request for repetition mode is set (judgment step 104). If the automatic request for repetition mode is set (i.e. if the result of judgment step 104 is "YES"), then the communications controller 28 is set to the full-duplex transmission mode, step 105, and the automatic request for repetition mode is used to transmission one page of image information (processing step 106, judgment step 107 "NO"). When the transmission of one page of image information is completed, the communications controller 28 is restored to the normal mode (processing step 108) and a check is made for whether or not there is another original to be sent (judgment step 109). If there is another page to be sent, (i.e. if the result of judgment step 109 is "YES"), then the multipage signal (MPS) is transmitted as the message tail signal (processing step 110). Then, after the response signal has been received from the receiver, the transmitter performs the transmitting of the following page of image information in accordance with the results of judgment of judgment step 104.

In judgment step 109, if there is no next page, then the procedure end signal (EOP) is transmitted as the message tail signal (processing step 112). Then, after the response signal has been received from the receiver (processing step 113), the disconnect instruction signal (DCN) is transmitted (processing step 114) and the line is restored to the network control apparatus 30. In addition, when there is image information transmission and the normal mode is set (judgment step 104 is "NO"), then the normal mode is used to transmit a one page of the image information of the original (processing step 116, judgment step 117 is "NO"). Then, when the transmission of the one page of image information ends, the presence or absence of the next page is judged in judgment step 109. The processing after judgment step 109 is the same as has already been described above.

Figure 8:
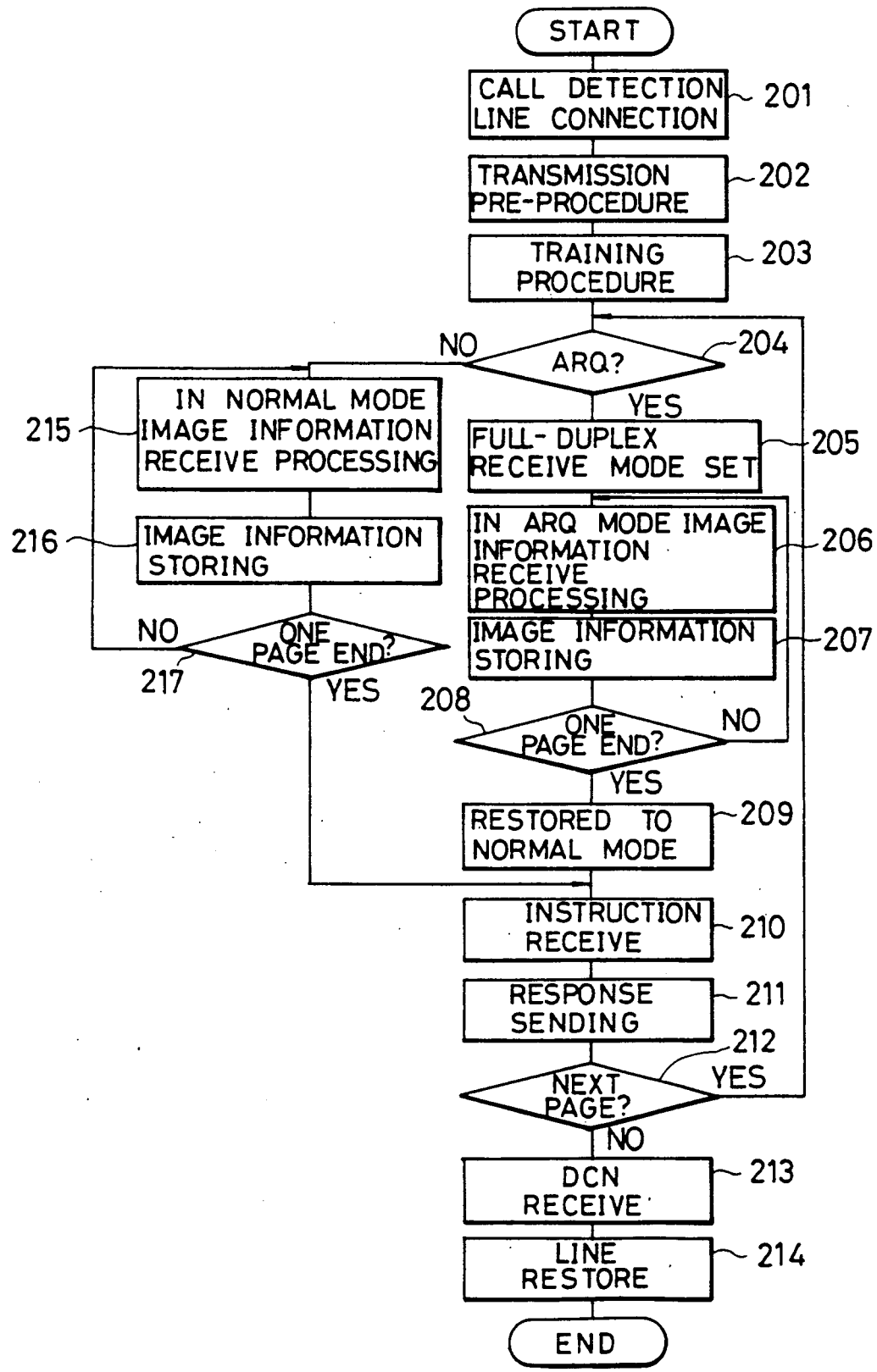
FIG. 8 is a flow chart indicating an example of the processing for receive.

FIG. 8 indicates an example of the processing for when there is receive operation at the receiver. This processing is performed on the basis of instructions from the controller 44. When a call is detected, the line is connected to the receiver by the network control apparatus 30 (processing step 201) and the transmission functions are set (processing step 202) after the predetermined transmission pre-procedures have been performed. A training procedure is performed (processing step 203) in order to train the modem 29 to the modem speed which is set at that time. When the training procedures have been completed, confirmation is made for whether or not the automatic request for repetition mode is set (judgment step 204). If the automatic request for repetition mode has been set (i.e. if the result of judgment step 204 is "YES"), then the communications controller 28 is set to the full-duplex receive mode (processing step 205). Then, image information is received in the automatic request for repetition mode and the received image information is stored for one page of an original (processing steps 206, 207; judgment step 208 "NO"). When the receiving of the one page of an original has been completed, the communications controller 28 is restored to the normal mode (processing step 209). Then, the receiver receives the message tail signal from the transmitter (processing step 210) and the results of demodulation of the image information are used as the basis for sending a response signal expressing the receive results (processing step 211). Then, a check is made for whether or not the message tail signal received in processing step 210 is a signal other than the procedure end signal (EOP) (judgment step 212). If this message tail signal is a signal other than a procedure end signal (EOP) ("YES" for judgment step 212), then the processing returns to judgment step 204 in order to receive the following page of image information. If the message tail signal is a procedure end signal (EOP) ("NO" for judgment step 212), then the receiver waits for the disconnect instruction signal (DCN) to be sent from the transmitter. Then, when the disconnect instruction signal (DCN) is received, the network control apparatus 30 restores the line (processing step 214). Furthermore, when the automatic request for repitition mode is not set ("NO" for judgment step 204), then image receive is performed for the normal mode and the one page of the image information that is received is stored (processing step 206, 207; "NO" for judgment step 208). Then, when receive processing is completed for that one page of the image information, the processing shifts to processing step 210. Processing after the processing step 210 is performed in the same manner as has been described above.

In the embodiment described above, when the automatic request for repetition mode is set, there is image information transferred between the memories of the transmission and the receiver. However, it is possible that when the communications procedures are the image information transmission status, the transmitter starts the image read and the receiver starts the output of the printed image. In addition, in the embodiment described above, a single frequency signal of 330 Hz is used as the backward signal. However, if a signal within a frequency band of the telephone line separate from the frequency band used by the high-speed modem functions is used, then a signal of some other frequency can be used.

As has been described above, in a facsimile apparatus according to the present invention, one pair of a band pass filter and a band elimination filter are provided and this band pass filter and band elimination filter are switchable in accordance with necessity, by a transmission system and a receive system. This is to say that unlike a conventional embodiment, there is not the necessity to provide both a band pass filter and a band elimination filter configuring a transmission system and a separate receive system. Accordingly, the cost of the apparatus can be reduced. Furthermore, the circuit board can also be made more compact, to therefore facilitate making the entire apparatus more compact.

The present invention is not limited to the aforementioned embodiments, and variations and modifications may be made without departing from the scope of the claimed invention.

What is claimed is:

1. A facsimile apparatus comprising:
   a transmission system for transmitting with respect to a line, an image signal from a modem and which has been divided into predetermined blocks units;
   a receiving system for receiving signals from the line;
   transmission error detect means for detecting a presence of transmission errors of image signal blocks that have been received by said receiving system;
   backward signal generation means for generating a backward signal for, on a basis of detection results of said transmission error detect means, notifying a party at the transmission system of the presence of transmission errors;
   retransmission means for retransmitting image signal blocks by said transmission system when the backward signal is received by said receiving system, said retransmission means having a backward signal detection means for detecting the backward signal in received signals;
   a band pass filter passing signals in a predetermined frequency band including a frequency of said backward signal;
   a band elimination filter passing signals in a frequency band other than a predetermined frequency band including the frequency of said backward signal;
   image communication control switching means for switching between an image transmission control to transmit image signals from a modem, by way of said band elimination filter and from said transmission system to the line, and an image receiving control to transfer image signals received by said receiving system to the modem by way of said band elimination filter;
   retransmission request switching means for switching between a retransmission control to supply image signals received by said receiving system to said backward signal detection means by way of said band pass filter, and a response control to send the backward signal from said backward signal generation means to the line by way of said band pass filter; and
   control means for controlling said image communication control switching means and said retransmission request switching means so that said image communication control switching means is switched to the image transmission control and said retransmission request switching means is switched to the retransmission control when the image signals are transmitted, and said image communication control switching means is switched to the image receiving control and said retransmission request switching means is switched to the response control when the image signals are received.

2. The facsimile apparatus as claimed in claim 1, further comprising:
   control switching means for switching between normal image transmission control for sending image signals from a modem to the line by said transmission system, and signal transmission control for sending a signal by said transmission system when transmission error occurs.

3. The facsimile apparatus as claimed in claim 1, wherein said image communication control switching means has a first switcher selecting one of the signal from the line and the signal from the modem and supplying a selected signal to said band elimination filter, and a second switcher supplying a signal output from said band elimination filter to one of the modem and the line.

4. The facsimile apparatus as claimed in claim 1, wherein said retransmission request switching means has a third switcher selecting one of a signal from the line and the backward signal from said backward signal generation means and supplying a selected signal to said band pass filter, and a fourth switcher supplying a signal output from said band pass filter to one of said backward signal detection means and the line.

5. The facsimile apparatus as claimed in claim 2, wherein, said image communication control switching means has a first switcher selecting one of the signal from the line and the signal from the modem and supplying a selected signal to said band elimination filter, and a second switcher having a first terminal and a second terminal and supplying a signal output from said band elimination filter to one of the modem via the first terminal and the line via the second terminal, and
   said control switching means has a switcher selecting one of the signal from the modem and the signal from the second terminal of said second switcher and supplying selected signal to the line.

6. The facsimile apparatus as claimed in claim 2, wherein said retransmission request switching means has a third switcher selecting one of a signal from the line and the backward signal from said backward signal generation means and supplying a selected signal to said band pass filter, and a fourth switcher having a first terminal and a second terminal and supplying a signal output from said band pass filter to one of said backward signal detection means via the first terminal and the line via the second terminal, and
   said control switching means has a switcher selecting one of the signal from the modem the signal from the second terminal of said switcher and supplying a selected signal to line.

7. The facsimile apparatus as claimed in claim 2, wherein
   said image communication control switching means has a first switcher selecting one of the signals from the line and one of the signals from the modem and supplying a selected signal to said band elimination filter, and a second switcher having a first terminal and a second terminal and supplying a signal output from said band elimination filter to one of the modem by way of the first terminal and the line by way of the second terminal, and wherein
   said retransmission request switching means has a third switcher selecting one of the signals from the line and the backward signal from said backward signal generation means and supplying a selected signal to said band pass filter, and a fourth switcher having a first terminal and a second terminal and supplying a signal output from said band pass filter to one of said backward signal detection means by way of the first terminal and the line by way of second terminal, and wherein said control switching means has a switcher selecting one of the signals from the modem, the signal from the second terminal of said second switcher and the signal from the second terminal of the fourth switcher and supplying a selected signal to the line.

* * * * *